(12) United States Patent
Lee et al.

(10) Patent No.: US 10,296,899 B2
(45) Date of Patent: May 21, 2019

(54) UNIVERSAL FUNDING CARD AND DELAYED ASSIGNMENT OF A FUNDING INSTRUMENT FOR A FINANCIAL TRANSACTION

(71) Applicant: PAYPAL, INC., San Jose, CA (US)

(72) Inventors: George Lee, Mountain View, CA (US); Hugo Olliphant, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 274 days.

(21) Appl. No.: 14/940,096

(22) Filed: Nov. 12, 2015

(65) Prior Publication Data

US 2016/0071093 A1 Mar. 10, 2016

Related U.S. Application Data

(63) Continuation of application No. 11/966,830, filed on Dec. 28, 2007, now abandoned.

(51) Int. Cl.
  *G06Q 20/40* (2012.01)
  *G06Q 20/34* (2012.01)
  *G06Q 20/12* (2012.01)
  *G06Q 20/24* (2012.01)
  *G06Q 20/20* (2012.01)

(52) U.S. Cl.
  CPC ........... *G06Q 20/356* (2013.01); *G06Q 20/12* (2013.01); *G06Q 20/204* (2013.01); *G06Q 20/24* (2013.01); *G06Q 20/40* (2013.01)

(58) Field of Classification Search
  CPC ............... G06Q 20/40; G06Q 20/3224; G06Q 20/4012; G06Q 20/4014; G06Q 20/20; G06Q 20/425; G06Q 20/32; G06Q 20/42; G06Q 40/02

USPC ........................................................ 705/44
See application file for complete search history.

(56) References Cited

U.S. PATENT DOCUMENTS

| | | |
|---|---|---|
| 6,886,741 B1 | 5/2005 | Salveson |
| 7,023,879 B1* | 4/2006 | Sitaraman ........... H04L 41/0896 370/465 |
| 7,177,836 B1 | 2/2007 | German et al. |
| 7,457,767 B1 | 11/2008 | Dunsmore et al. |
| 7,620,603 B2* | 11/2009 | Gilder ................... G06Q 20/04 705/39 |

(Continued)

OTHER PUBLICATIONS

Access Denied—Low-income and minority families face more credit constraints and higher borrowing costs, Christian E. Weller, Aug. 2007 43 pages (Year: 2007).*

*Primary Examiner* — Bruce I Ebersman
(74) *Attorney, Agent, or Firm* — Haynes and Boone, LLP (57) ABSTRACT

A universal funding card and the delayed assignment of a funding instrument for a financial transaction are described herein. In one embodiment, a system for facilitating a financial transaction comprises a communications interface; a database storing data regarding a user and a plurality of funding instruments associated with that user; and a payment processing system configured to receive a request for payment authorization from a merchant via the communications interface, to authorize payment to the merchant prior to selection of a funding instrument, and after authorizing payment to the merchant, receive instructions regarding a funding instrument to debit for the payment.

15 Claims, 5 Drawing Sheets

(56) References Cited

U.S. PATENT DOCUMENTS

| | | | | |
|---|---|---|---|---|
| 7,752,132 B2* | 7/2010 | Stewart | ............... | G06Q 20/04 |
| | | | | 705/35 |
| 7,860,880 B2* | 12/2010 | Drucker | ............ | G06Q 10/0635 |
| | | | | 705/311 |
| 8,027,917 B2* | 9/2011 | Easterly | ............... | G06Q 20/10 |
| | | | | 705/39 |
| 8,086,539 B2* | 12/2011 | Nauman | ............... | G06Q 20/02 |
| | | | | 705/64 |
| 8,175,938 B2* | 5/2012 | Olliphant | ............... | G06Q 20/02 |
| | | | | 705/35 |
| 2002/0016765 A1 | 2/2002 | Sacks | | |
| 2004/0024703 A1 | 2/2004 | Roskind | | |
| 2006/0085335 A1 | 4/2006 | Crawford et al. | | |
| 2006/0149670 A1* | 7/2006 | Nguyen | ............... | G06Q 20/10 |
| | | | | 705/39 |
| 2007/0080218 A1 | 4/2007 | Madsen et al. | | |
| 2007/0090182 A1 | 4/2007 | Phagura et al. | | |
| 2007/0150411 A1 | 6/2007 | Addepalli et al. | | |
| 2008/0086396 A1* | 4/2008 | Hahn-Carlson | ......... | G06Q 20/102 |
| | | | | 705/34 |
| 2009/0089176 A1 | 4/2009 | McCabe | | |

* cited by examiner

UNIVERSAL FUNDING CARD AND DELAYED ASSIGNMENT OF A FUNDING INSTRUMENT FOR A FINANCIAL TRANSACTION

CROSS REFERENCE TO RELATED APPLICATIONS

This application is a continuation of U.S. patent application Ser. No. 11/966,830, filed Dec. 28, 2007, which is also hereby incorporated by reference in its entirety.

BACKGROUND

Field of the Invention

The present disclosure relates generally to financial transactions and more particularly to a universal funding card and the delayed assignment of a funding instrument for a financial transaction.

Related Art

In many instances, customers shopping for products and/or services directly from a merchant will typically fund the face-to-face purchases of those goods and services with a funding instrument such as a credit or debit card (cash or check). Customers will typically carry any number of credit cards to satisfy a variety of accounting purposes including one or more cards for business related purchases and one or more cards for personal related purchases. Accordingly, in addition to being cumbersome and inconvenient, carrying or being in possession of many cards at one time substantially increases the risk of the card being lost or stolen. There is also the possibility that some forms of payment are not accepted by the merchant (e.g. American Express, personal checks, etc). Furthermore, having to make an on-the-spot decision as to which card to use for which purchase may be confusing and pose a financial risk for many individuals. In this regard, many credit cards include joint accounts that may be accessed and utilized by two or more individuals. As such, accurate knowledge of associated balances for one or more cards at any given time may be difficult if not impossible.

Likewise, customers may search for and purchase products and/or services through electronic communications with online merchants over electronic networks such as the Internet. During the course of these transactions, customers may provide payment for items in various ways including, for example, credit cards, electronic fund transfers, and other payment schemes offered by service providers. Similar to their direct purchase counterparts, online customers may encounter confusion, indecision, and financial risk as they must decide at the time of purchase which funding instrument to use for each purchase and whether or not the funding instrument is sufficiently funded to avoid overdraft and other penalties.

Accordingly, there exists a need for a universal funding card and the delayed assignment of a funding instrument for a financial transaction.

SUMMARY

For purposes of summarizing the disclosure, exemplary embodiments for a universal funding card and the delayed assignment of a funding instrument for a financial transaction have been described herein.

In one embodiment, a system for facilitating a financial transaction comprises a communications interface; a database storing data regarding a user and a plurality of funding instruments associated with that user; and a payment processing system configured to receive a request for payment authorization from a merchant via the communications interface, to authorize payment to the merchant prior to selection of a funding instrument, and after authorizing payment to the merchant, receive instructions regarding a funding instrument to debit for the payment.

In another embodiment, a network payment processing system configured to receive a purchase request for one or more items, authorize the immediate purchase of the one or more items, and permit the delayed assignment of a funding instrument at the time of purchase for the one or more items is disclosed.

In still another embodiment, a method for facilitating a financial transaction comprises receiving a purchase request; processing the purchase request; and authorizing the purchase of the one or more items prior to the assignment of a funding instrument for the payment of the one or more items.

These and other embodiments will become readily apparent to those skilled in the art form the following detailed description of the various embodiments having reference to the attached figures, the invention not being limited to any particular preferred embodiment(s) disclosed.

Embodiments of the invention are understood by referring to the detailed description that follows. It should be appreciated that like reference numerals are used to identify like elements illustrated in one or more of the figures, wherein showings therein are for purposes of illustrating embodiments of the invention and not for purposes of limiting the same.

DETAILED DESCRIPTION

Exemplary embodiments will now be described with references to the accompanying figures, wherein like reference numbers refer to like elements throughout. The terminology used in the description presented herein is not intended to be interpreted in any limited or restrictive manner simply because it is being utilized in conjunction with a detailed description of certain embodiments. Furthermore, various embodiments (whether or not specifically described herein) may include novel features, no single one of which is solely responsible for its desirable.

Embodiments of the present disclosure enable users to overcome the inconvenience, confusion, indecision, and financial risk typically associated with the possession and/or use of multiple funding instruments for the real-time purchase of products and/or services by providing a universal funding card and the delayed assignment of a funding instrument for a financial transaction.

Embodiments of the present disclosure are described herein as they relate to a financial transaction as it may occur in an electronic payment system environment. An electronic payment system is generally considered as any kind of network service that includes the exchange of money for goods or services. Such network payment system includes, for example, a credit and/or debit card processing system. For convenience, simplicity, and efficiency the present disclosure is described relative to and online or web-based transaction. However, persons of ordinary skill in the art will understand that the teachings of the present disclosure apply equally to financial transactions that occur directly between a buyer and a merchant such as in a face-to-face transaction that may occur in department store or similar type business environment.

In one embodiment, the network may be implemented as a single network or a combination of multiple networks. For example, in various embodiments, the network may include the Internet and/or one or more intranets, landline networks, wireless networks, and/or other appropriate types of communication networks. In other example, the network may comprise a wireless telecommunications network (e.g., cellular phone network) adapted to communicate with other communication networks, such as the Internet.

Figure 1:
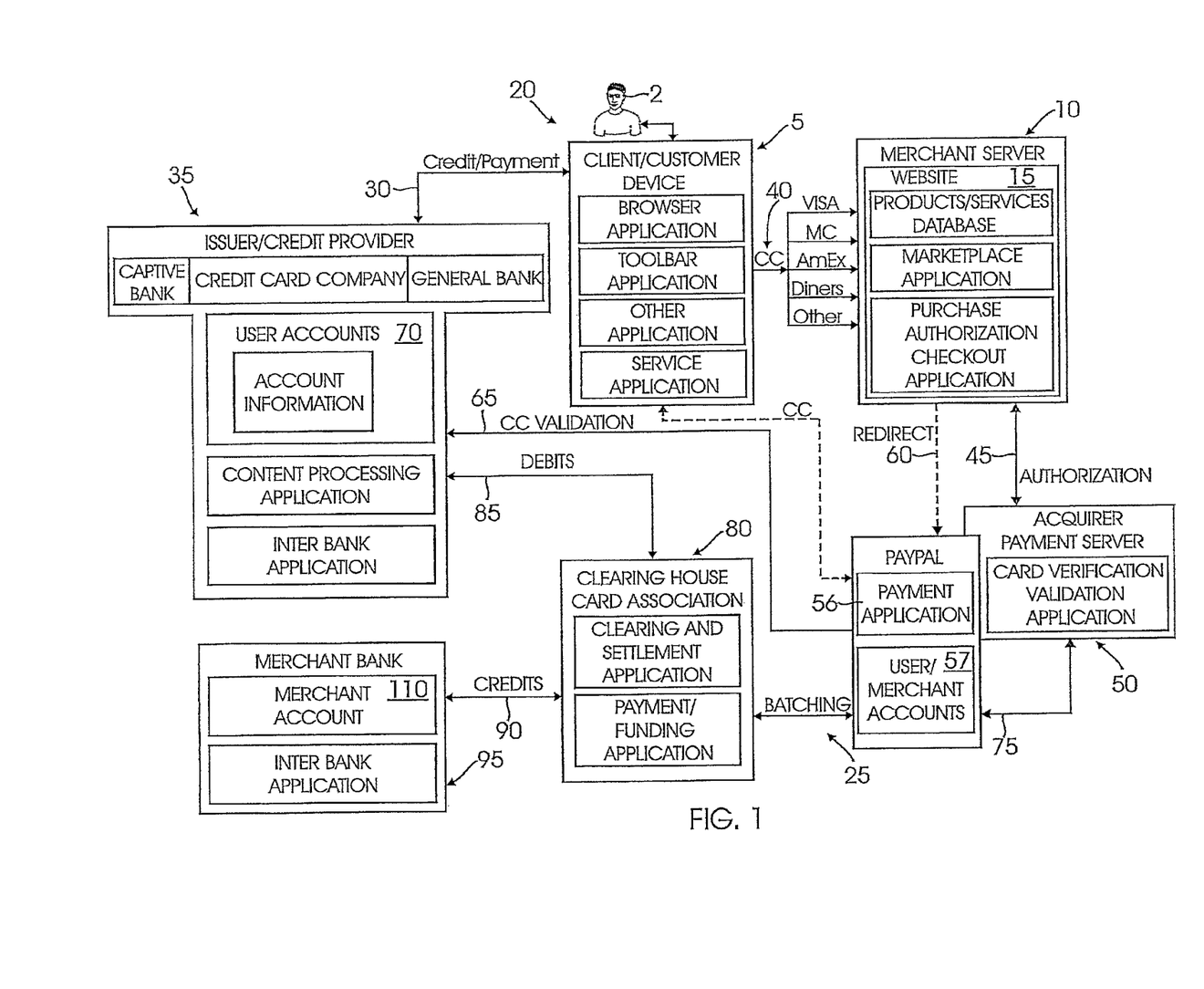
FIG. 1 shows a block diagram of a known networked system configured to facilitate online transactions with a funding instrument.

In one known scheme, as generally shown in FIG. 1, besides a client system 5 (also referred to as a "user" system herein), a merchant system 10, and a merchant provided website 15 for the sale of goods and/or services, the flow of information and money between the parties in a credit card system 20 occurring along a network 25 such as the Internet, generally includes several intermediaries involved in a typical credit card transaction.

Generally, in the credit card system 20, a customer 2 (also referred to as a "user", "buyer", "client", or "cardholder" herein) is issued credit 30 after an account has been approved by a credit provider or issuer 35 such as a financial institution or other organization. The credit provider 35 registers the cardholder 2, issues a credit card(s), and operates a card account to which payments can be charged. The cardholder 2 is able to make purchases with the credit card for products and/or services from a merchant accepting that credit card up to a pre-established credit limit.

By one definition, credit card interchange is the process by which all parties involved in a credit card transaction manage the processing, clearing and settlement of credit card transactions, including the assessment, and collection and/or distribution of fees between parties.

In this regard, the cardholder 2 chooses one of multiple funding instruments 40, such as a credit card, to pay for the purchase and the merchant submits the transaction for authorization 45. The issuing bank or credit provider 35 has up-to-date information on the customer's account status. However, as there are many banks that issue credit cards, it would be inconvenient if each merchant had to figure out which bank issued the card and contact the bank for credit card verification. Accordingly, a financial institution or other organization (acquirer) 50 acting as a payment provider, processor, or gateway may provide card services to the merchant. In this regard, to process credit cards in real-time, merchants establish a connection from their website 15 to the payment processing system 50. Gateway connections may be made by developing in-house solutions, or by contracting with an outsourced payment processing system 50 having an application programming interface (API) for card verification and processing service to the merchant 10. The APIs are generally HTTP or TCP/IP based and provide a relatively simple interface to communicate with the merchant's application software.

In this regard, a payment processing system 50 such the system provided by PayPal Inc. of San Jose, Calif., USA may act as the payment provider gateway between the buyer and seller (merchant) to provide payment processing for online transactions on behalf of the buyer so that the buyer never has to expose his payment information directly to the seller. Instead the buyer registers his credit card or bank account with the payment processing system 50, maps the account to an email address, and then uses the payment processing system 50 to make purchases when redirected 60 to the payment processing system 50 from the merchant's site 15. Upon completion of the purchase the buyer is directed back to the merchant's site 15 to an order confirmation page In this regard, the payment processing system 50 may include one or more payment applications 56 and user and/or merchant accounts 57, which may be configured to interact with the client system 5 and/or each of the merchant servers 10 over the network 25 to facilitate the purchase of items, products and/or services by the user 2 from the merchant server 10.

The payment processing system 50 receives the credit card data, validates 65 the card, and communicates with the credit provider's system 35 to verify the amount for the transaction is available in the customer's account 70. If the card is good and the funds are available, the payment processing system 50 sends an approved message back to the merchant. If the card is bad or if funds are not available, the payment processing system 50 sends a declined message back to the merchant After the transaction is authorized 45 it is then stored in a batch, which the merchant sends to the payment processing system 50 later to receive payment.

As transactions (payments and credits) arrive at the payment processing system 50, they are batched 75 through to the appropriate clearinghouse or card association 80. In this case, the customer 2 may get a message from the website 15 stating their order was received and will be processed. Later, the system 20 might send the customer 2 an e-mail with notification of a successful card authorization (or failure). As the clearinghouse 80 receives transactions from all the gateways, the clearinghouse batch the transactions for all the banks involved, debiting monies 85 from the customer's bank (credit provider) 35 and crediting 90 the merchant's bank 95.

The issuer 35 charges the cardholder's account 70 at regular intervals and notifies the cardholder 2 of the transactions and accumulated charges. The cardholder 2 pays 30 the corresponding charges to the issuer 35.

Persons of ordinary skill in the art will understand that although each of the tasks in the credit card interchange may be performed by a different entity, one or more of the tasks may be done by a single entity. For example, the task of issuing credit may be done by a credit provider, while the tasks of establishing and maintaining a merchant's account, authorization, and clearing and settlement may all be done by a full-service third-party processing company or commerce service provider (CSP).

As indicated above, unfortunately, when making real-time point of sale purchases consumers are often forced to make hasty decisions regard which card and account type to use to make the purchase. Furthermore, it is often difficult or inconvenient for customers to determine whether sufficient funds are available to make a certain purchases while visiting a merchant's website 15. For example, it is typically incumbent on customers to access their personal financial records, or visit a separate financial website in order to ascertain the current account balance associated with a desired method of payment. These additional steps can detract from the customer's online experiences and inconvenience consumers when making online purchases. In addition, the inability to ascertain whether sufficient funds are available may result in overdraft or other associated fees for purchases made when funds are unavailable at the time of purchase.

For merchants, such inconveniences can translate into potential lost sales to the extent that otherwise willing customers are deterred from completing online transactions. In particular, if customers are forced to visit other websites or retrieve locally-stored records before engaging in online transactions, customers may become distracted or attracted to a merchant's competitors while taking such actions.

The present disclosure addresses, among other things, the problem of having to decide at the time of purchase which funding instrument(s) to use to make a particular purchase by providing a universal funding card and the complete or partial delayed assignment of a funding instrument(s) for a financial transaction.

Figure 2:
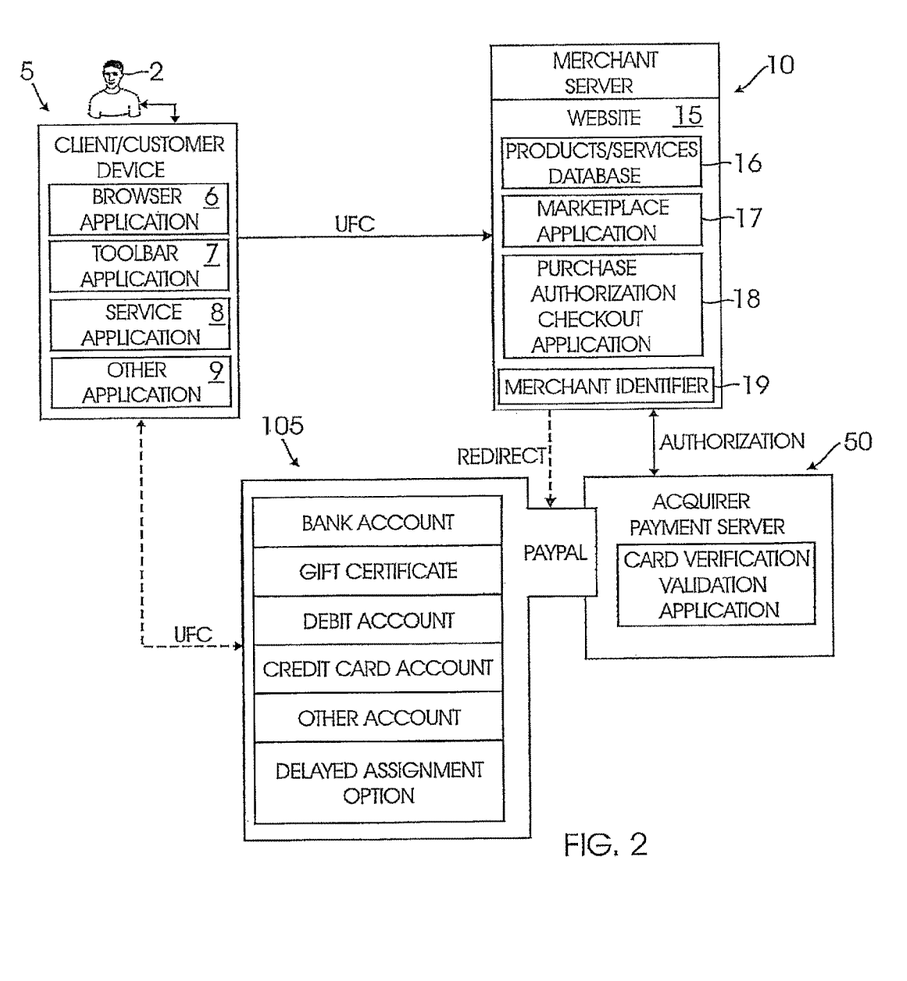
FIG. 2 shows a block diagram of a universal funding card method for a financial transaction in the networked system of FIG. 1 in accordance with one embodiment.

A block diagram of a universal funding card method for a financial transaction in the networked system of FIG. 1 in accordance with one embodiment is shown in FIG. 2. Other than the use of a universal funding card to make real-time purchases, delayed assignment of a funding instrument for a financial transaction, eventual assignment of the funding instrument, and debiting of the assigned funding instrument based on the assignment, the interchange process described above in regard to the use of a credit card including authorization, batching, clearing and settlement, and funding generally remains the same.

In one embodiment, the client system 5 may include one or more browser applications 6 which may be used, for example, to provide a user interface to permit the user 2 to browse information available over the network 25. For example, the browser application 6 may be implemented as a web browser to view information available over the Internet.

The client system 5 may include one or more toolbar applications 7, which may be used, for example, to provide client-side processing for performing tasks in response to operations selected by the user 2. For example, the toolbar application 7 may display a graphical user interface (GUI) in connection with the browser application 6.

The client system 5 may further include a service application 8 for facilitating financial transactions on the network 25 and other applications 9 to provide additional features to the user 2. In one implementation, the service application 8 comprises a software program, such as a graphical user interface (GUI), executable by a processor that is configured to interface and communicate with the one or more merchant servers 10 and the payment processing system 50 via the network 25. The user 2 is able to access merchant websites 15 via merchant servers 10 to view and select items for purchase, and the user 2 is able to purchase selected items from merchants by communicating with the payment processing system 50.

When installed and executed by the client system 5, the service application 8 may be configured to provide and display a payment mechanism, such as an image or icon, on the display component (e.g., monitor) of the client system 5.

In one embodiment, the one or more merchant servers 10 may be maintained, for example, by one or more merchants offering one or more items, such as products and/or services, in exchange for financial payment to be received from users, such as the user 2 or from the payment processing system 50 acting on behalf of the user 2, over the network 25. In this regard, each of the one or more merchant servers 10 may include a database 16 for identifying available products and/or services, which may be made available to the client system 5 for viewing and purchase by the user 2. Accordingly, each of the merchant servers 10 may include a marketplace application 17, which may be configured to provide information over the network 25 to the browser application 6 of the client system 5. For example, the user 2 may interact with the marketplace application 17 through the browser application 6 over the network 25 to search and view various items, products and/or services identified in the database 6.

Each of the one or more merchant servers 10 may include a checkout application 18, which may be configured to facilitate online purchase transactions by the user 2 of products and/or services identified by the marketplace application 17. In this regard, the checkout application 18 may be configured to accept payment information from the user 2 and/or from payment processing system 50 over the network 25.

The one or more merchant servers 10 may include one or more merchant identifiers 19, which may be included as part of the one or more items made available for purchase so that particular items are associated with a particular merchant. The merchant identifier 19 may include attributes related to the merchant, such as business and banking information. In various implementations, the merchant identifier 19 may be passed with a user purchase request to the payment processing system 50 when the user 2 selects an item for purchase, and the merchant identifier 19 may be used by the payment processing system 50 to associate a particular item purchased with a particular merchant account 110 maintained by the payment processing system 50.

In one embodiment, as shown in FIG. 2, a user 2 is issued a universal funding card (UFC) 100 that is used to complete a product and/or service purchase. Upon selection of a product and/or service the UFC 100 is swiped at a point-of-sale terminal in a direct financial transaction or the UFC card number is entered at a merchant's website 15. In the case of an online transaction, entering the UFC card number at the merchant's website 15 redirects the user to the payment processing system 50 where the user 2 is given a choice of complete or partial assignment of a funding instrument 105 for the financial transaction at the time of purchase and/or the complete or partial delayed assignment of the funding instrument for the financial transaction until some later date. In either case, the products and/or services are purchased by the user 2 immediately, i.e., in real-time, while the choice of one or more funding instruments for the financial transaction may or may not be delayed.

Funding instruments 105 made available to the user 2 are embedded on one or more lines of the magnetic card stripe found on the UFC 100. Funding instruments 105 for purchase and immediate assignment of the funding instrument for the financial transaction may include, but are not limited to, a bank account, gift certificate, debit account, credit card account, and/or other account such as a designated business or personal account. When one or more funding instruments 105 are assigned at the time of purchase the payment processing system 50 processes the user's assigned funding instrument 105 as generally detailed above in regarding the a credit card interchange. Accordingly, the funding instrument 105 is authorized, and funds are cleared, settled, and distributed to the merchant's account 110 and debited from the user's account 70 (see FIG. 1).

In one embodiment, by choosing an appropriate icon, for example, a "remind me later" (delayed assignment option) icon, the user 2 may choose to purchase a product and/or service but delayed assignment of a funding instrument 105 for a financial transaction until some later date which may be set or established by the payment processing system 50. In this regard, the user 2 may decide at the time of purchase to delay assignment of one or more funding instruments 105 for the payment of the one or more items purchased to some later date. Alternatively, the user 2 may decide to make a partial assignment of one or more funding instruments 105 for the payment of the one or more items and delay assignment of one or more funding instrument 105 for the remaining payment of the one or more items purchased.

Authorization (acceptance or decline) for such a delayed assignment of a funding instrument may be based on such factors as credit worthiness, payment history, cash reserves, etc., and determined by an acceptance logic application. Upon authorization, the products and/or services are purchased by the user 2.

Figure 3:
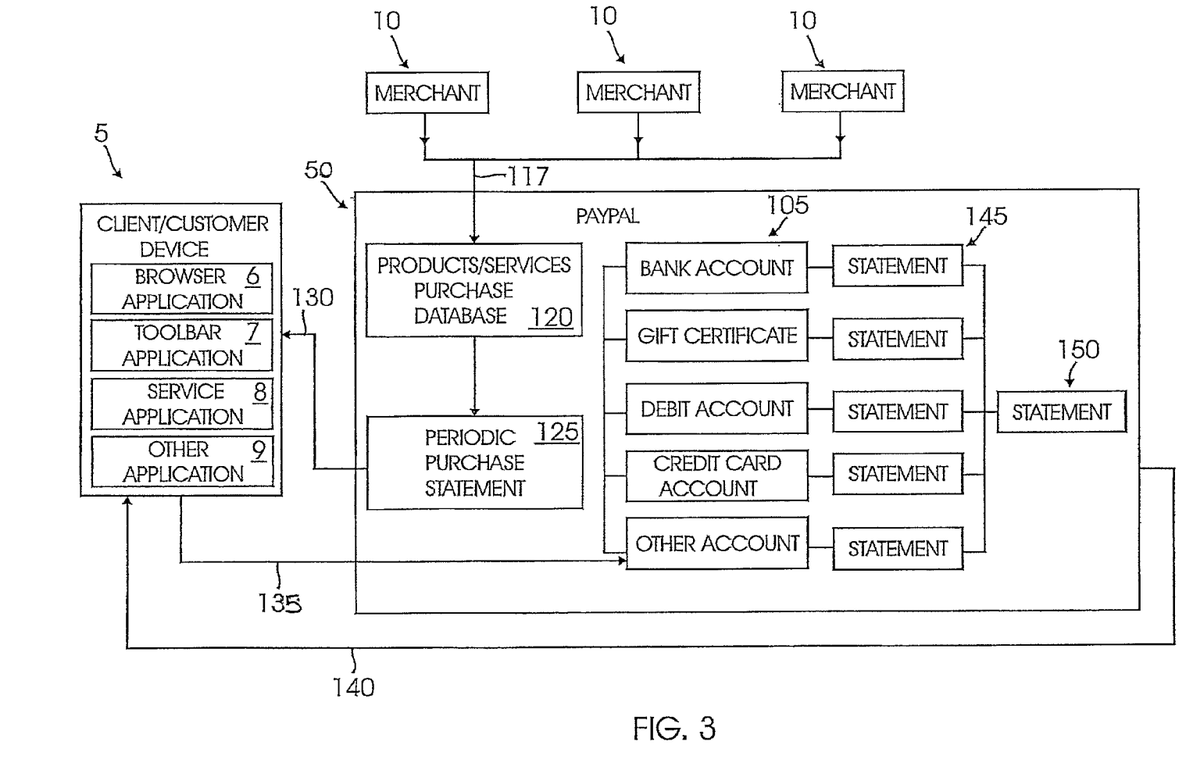
FIG. 3 shows a block diagram of a delay assignment of a funding instrument method in a financial transaction in the network system of FIG. 1 in accordance with one embodiment.

As shown in FIG. 3, data 117 relating to each of the financial transactions opted by the user 2 for complete or partial delayed assignment of a financial instrument is communicated from the one or more merchant servers 10 to the payment processing system 50 where the data 117 may be stored in a purchase database 120. Such data 117, which may be contained in the merchant identifier 19, may include identification of the product and/or service purchased, cost or amount owed, and merchant information.

At regular intervals, perhaps monthly, a financial transaction or purchase statement 125 indicated the data of each financial transaction(s) in which delayed assignment of a financial instrument was chosen during the purchase of a product and/or service may be communicated 130 to the user 2.

Upon receipt of the periodic purchase statement 125 the user 2 is able to review finances, account information including balances, as well as make appropriate funding deposits, withdrawals, and/or transfers to various accounts prior to assigning one or more funding instruments 105 to each of the financial transaction(s) contained in the purchase statement 125. Of course, the user 102 may also make a deposits, withdrawal, and payments to one or more of the funding instrument accounts at anytime prior to receiving purchase statement 125. In this manner, the user 2 is better able to evaluate and decide on which funding instrument 105 to assign for each financial transaction to better manage business and personal finances, as well as potentially avoiding overdraft and other penalties when compared to the immediate real-time assignment of a funding instrument for a financial transaction.

The user 2 then communicates 135 back to the payment processing system 50 the desired assignment of the one or more funding instruments 105 for each financial transaction in which the complete or partial delay assignment of the funding instrument was chosen. The payment processing system 50 then debits the corresponding funding instrument account accordingly, and communicates 140 to the user 2 information regarding financial activities for each funding instrument account in subsequent account statements 145 or in a single accounts summary statement 150.

Accordingly, in one embodiment, funds for purchase of the selected products and/or services in the delayed assignment of a funding instrument are distributed immediately to the merchant's account 110 from an account maintained by the payment processing system 50. Accounting of such distributions are tracked by the payment processing system 50 until the user 102 assigns a funding instrument, at which time, funds are debited from the designated funding instrument account of the user 102 and distributed into the account maintained by the payment processing system 50.

In another embodiment, an initial default funding instrument may be assigned by user 102 so that funds for a particular purchase may be distributed to the merchant within a reasonable time. In this regard, the user 102 may do nothing and funds from the initial default account would be withdrawn as required and paid to the merchant within a predetermined time limit. Alternatively, if within the predetermined time limit the user 102 wanted to reassign the purchase to another funding instrument, the user 102 may do so and the funds for the purchase would be debited from the alternative funding account and distributed to the merchant.

Figure 4:
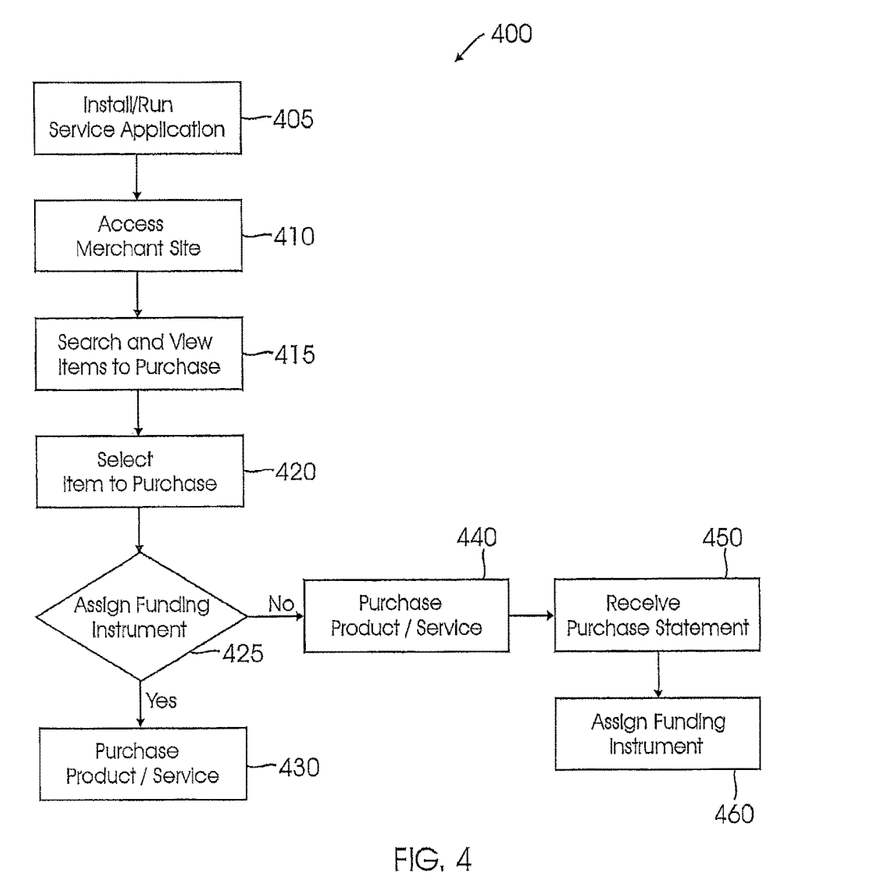
FIG. 4 shows a method for a delayed assignment of a funding instrument in a financial transaction with reference to a client in accordance with one embodiment.

FIG. 4, shows a method 400 for a delayed assignment of a funding instrument in a financial transaction with reference to a user in accordance with one embodiment.

As previously discussed, the service application 8 allows the client device 5 to communicate with one or more of the merchant servers 15 via the network 25 to select items for purchase and further communicate with the payment processing system 50 to process online purchase requests and/or transactions for items selected for purchase.

In one embodiment, upon user instruction, the service application 8 may be installed and/or run on the client system 5 (block 405) to access at least one merchant website 15 via a related merchant server 15 (block 410) to search the accessed merchant website 15 and view one or more items for purchase (block 415). In one embodiment, upon installation, the user 2 may be prompted to establish a user account 57 with the payment processing system 50, wherein the user 2 may use the client system 5 to access the payment processing system 50 via the network 25. When establishing a user account 57, the user 2 may be asked to provide personal information, such as name, address, phone number, etc., and financial information, such as banking information, credit card information, etc.

Next, the user 2 may generate a purchase request for at least one item by selecting the at least one item (block 420) from the merchant's site 15. Methods of item selection (product and/or service) and communication of the purchase request including user information, merchant information, and selected item information to the payment processing system 50 for payment processing is generally well-known in the art. It should be appreciated by those skilled in the art that more than one item may be selected for purchase prior to completing the online purchase transaction as well as deciding whether to assign a single funding instrument or multiple funding instruments at the time of purchase or delaying complete or partial assignment of the one or more funding instruments. For example, a plurality of items may be selected and placed in a virtual shopping cart and then purchased in a single online purchase transaction.

At this point, the user 2 is given a choice of assigning a funding instrument 105 at the time of purchase or delaying the assignment of the funding instrument (block 425). In other words, even though the items are purchased in real-time, the user may decide to delay assignment of a funding instrument of the financial transaction. As explained below, even though one or more items may have been purchased in a single financial transaction, the subsequent assignment of funding instrument may include multiple funding instruments including one or more funding instruments for each item purchased.

In either case of assigning a funding instrument or delaying assignment of the funding instrument, the user 2 may provide user identification or at least verify the user identification for a related user account 57 stored in payment processing system 50 so that authorization (acceptance or decline) for the financial transaction by the payment processing system 50 can be completed. Once proper user identification is provided and/or verified, the online purchase transaction may be completed (blocks 430 and 440).

As indicated above, at regular intervals, perhaps monthly, a financial transaction or purchase statement 125 indicated the data of each financial transaction(s) in which complete or partial delayed assignment of a financial instrument was chosen during the purchase of a product and/or service is received by the user 2 (block 450). The user 2 then transmits, communicates, or otherwise sends back to the payment processing system 50 the desired assignment of the one or more funding instruments 105 for each of the one or more items purchased in each of the one or more financial transaction in which the complete or partial delay assignment of the funding instrument (block 460) was indicated.

Figure 5:
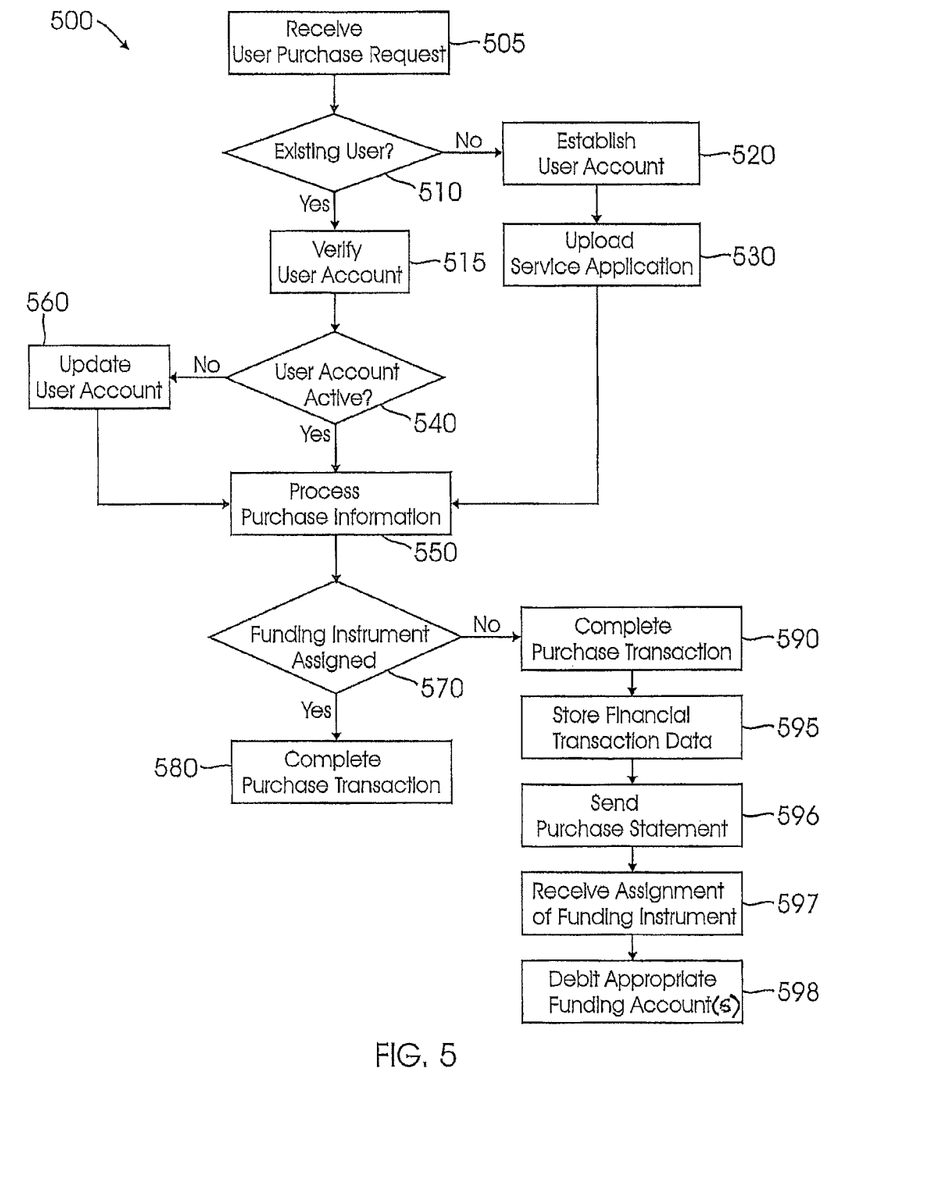
FIG. 5 shows a method for a delayed assignment of a funding instrument in a financial transaction with reference to a payment provider in accordance with one embodiment.

FIG. 5 shows a method 500 for a delayed assignment of a funding instrument in a financial transaction with reference to a payment processing system in accordance with one embodiment. As shown in FIG. 5, the payment processing system 50 receives a purchase request from the user 2 via the client system 5 (block 505). As previously discussed in reference to FIG. 4, the user 2 will typically begin an online transaction by selecting an item for purchase which initiates the user purchase request with the payment processing system 50.

Upon receiving the user purchase request (block 505), the payment processing system 50 may determine whether the user 2 is an existing user having an established user account 57 by, for example, checking a user account list in a user account database (block 510). If the user 2 does not have an established user account, then the payment processing system 50 may prompt the user 2 to establish a user account 57 by providing user information (block 520), and the payment processing system 50 uploads the service application 8 to the client system 5 so that the user 2 may install and run the service application 8 on client system 5 (block 530). Once the service application 8 is installed and run on the client device 5, the payment processing system 50 processes the purchase information provided in the user purchase request (block 550).

Otherwise, if the user 2 is determined to be an existing user by the payment processing system (block 510), then the payment processing system 50 verifies the user account and user identification information provided by user 2 in the user purchase request (block 515). For example, as previously discussed, the user 2 may be prompted to provide user identification to purchase any selected items and complete the online transaction. Next, the payment processing system 50 may determine if the user account is current and active (block 540). In some instances, a user's account information may need to be updated, and thus, the payment processing system 50 may prompt the user 2 to update user account information in the user account 57 for the user 2 (block 560). If the user account 57 is current and active, then the payment processing system 50 processes the purchase information in the user purchase request (block 550). It should be appreciated by those skilled in the art that the payment processing system 50 may cancel the online purchase transaction at any point in the process if it is determined, for example, that the user 2 enters wrong information.

The purchase information may include information related to the item selected for purchase, information related to the merchant providing the item selected for purchase, information related to the user including user account number, balance information, credit card information, etc. In one implementation, the payment processing system 50 may optionally access the merchant site 15 via the merchant server 10 to verify purchase information including verifying that the selected item is available (e.g., in stock), verifying the pricing information, verifying that the merchant account is up-to-date, etc.

The payment processing system 50 then determines if the user 2 has assigned a funding instrument 105 or chosen complete or partial delayed assignment of the funding instrument (block 570). In either case, authorization (acceptance or decline) for the financial transaction by the payment processing system 50 may be completed by verifying user information and account 57 details stored in the payment processing system 50. Once proper user identification is provided and/or verified, the online purchase transaction may be completed (blocks 580 and 590). In one example embodiment, completing the purchase request may include redirecting the user 2 to a page on the merchant site 15 that confirms their purchase of the selected product to provide, for example, a receipt to the user 2.

Data 117 relating to each of the financial transaction(s) chosen for delayed assignment of a funding instrument 105 is stored in a purchase database 120 (block 595). Such data 117, which may be contained in the merchant identifier 19, may include identification of the product and/or service purchased, cost or amount owed, and merchant information.

At regular intervals, perhaps monthly, a financial transaction or purchase statement 125 indicated the data 117 of each financial transaction(s) in which delayed assignment of a financial instrument was chosen during the purchase of a product and/or service may be communicated 130 to the user 2 (block 596).

The payment processing system 50 receives back from the user 2 the assignment of the one or more funding instruments 105 for each item of each financial transaction in which the delay assignment of the funding instrument was chosen (block 597). The payment processing system 50 then debits and/or credits the corresponding funding instrument account(s), and communicates 140 to the user 2 information regarding financial activities for each funding instrument account in corresponding account statements 145 or in a single accounts summary statement 150 (block 598).

Although the method(s)/step(s) are illustrated and described herein as occurring in a certain order, the specific order, or any combination or interpretation of the order, is not required. Obvious modifications will make themselves apparent to those of ordinary skill in the art, all of which will not depart from the essence of disclosed subject matter, and all such changes and modifications are intended to be encompassed within the appended claims.

What is claimed is:

1. A method for processing a transaction using a transaction card, comprising:
   receiving, from a device, a request to establish an account based on a plurality of funding instruments;
   establishing the account based on the plurality of funding instruments;
   generating a card identifier for the account; and
   loading a service application to the device;
   receiving the card identifier associated with the transaction card during a checkout process for the transaction;

determining the plurality of funding instruments associated with the card identifier;

presenting a first request to select one of a first option or a second option through the service application associated with the card identifier, wherein the first option delays assignment of a payment for the transaction to one or more of the plurality of funding instruments, wherein the second option assigns a first one of the plurality of funding instruments to process a first portion of the payment during the checkout process, wherein the second option requires a selection of the first one of the plurality of funding instruments and a selection of an amount for the first portion of the transaction, wherein the second option delays assignment of a second one of the plurality of funding instruments during the checkout process for a second portion of the payment based on at least one of credit worthiness of a user associated with the plurality of funding instruments, a payment history of the user, cash reserves of the user, a total amount of the transaction, and wherein the presenting is performed through a first display of a graphical user interface (GUI) of the service application during the checkout process in response to an entry of the card identifier for the transaction;

in response to receiving a selection of one of the first option or the second option, processing of the payment for the transaction, wherein receiving a selection of the second option causes processing of the payment for the transaction using the first one of the plurality of funding instruments for the first portion of the transaction instead of the account of a payment provider;

subsequent to the processing of the payment for the transaction, automatically assigning a second one of the plurality of funding instruments for a reimbursement transaction to the payment provider for the payment, wherein the reimbursement transaction is processed at a later time;

presenting, after the checkout process and prior to the later time, a second request to change the second one of the plurality of funding instruments to assign to the processed transaction at the later time, wherein the presenting is performed through a second display of the GUI of the service application; and processing the reimbursement transaction at the later time based on the second request.

2. The method of claim 1, wherein the second portion is provided using the account of the payment provider.

3. The method of claim 1, wherein at least one of the plurality of funding instruments is a payment account with the payment provider for a user associated with the plurality of funding instruments.

4. The method of claim 3, further comprising:
determining that the user is an existing user with the payment provider and the payment account is active with the payment provider.

5. A payment provider system comprising:
a non-transitory memory storing information for a plurality of funding instruments and an account of the payment provider system; and
one or more hardware processors configured to execute instructions to cause the payment provider system to perform operations comprising:
receiving, from a device, a request to establish the account based on a plurality of funding instruments;
establishing the account based on the plurality of funding instruments;
generating a card identifier for the account; and
loading a service application to the device;
receiving the card identifier associated with a transaction card during a checkout process for a transaction;
determining the plurality of funding instruments associated with the card identifier;
presenting a first request to select one of a first option or a second option through the service application associated with the card identifier, wherein the first option delays assignment of a payment for the transaction to one or more of the plurality of funding instruments, wherein the second option assigns a first one of a plurality of funding instruments to process a first portion of the payment during the checkout process, wherein the second option requires a selection of the first one of the plurality of funding instruments and a selection of an amount for the first portion of the transaction, wherein the second option delays assignment of a second one of the plurality of funding instruments during the checkout process for a second portion of the payment based on at least one of credit worthiness of a user associated with the plurality of funding instruments, a payment history of the user, cash reserves of the user, a total amount of the transaction, and wherein the presenting is performed through a first display of a graphical user interface (GUI) of the service application during the checkout process in response to an entry of the card identifier for the transaction;
in response to receiving a selection of one of the first option or the second option, processing of a payment for the transaction, wherein receiving a selection of the second option causes processing of the payment for the transaction using the first one of the plurality of funding instruments for the first portion of the transaction instead of the account of the payment provider system;
subsequent to the processing of the payment for the transaction, automatically assigning a second one of the plurality of funding instruments for a reimbursement transaction to the payment provider system for the payment, wherein the reimbursement transaction is processed at a later time;
presenting, after the checkout process and prior to the later time, a second request to change the second one of the plurality of funding instruments to assign to the processed transaction at the later time, wherein the presenting is performed through a second display of the GUI of the service application; and
processing the reimbursement transaction at the later time based on the second request.

6. The payment provider system of claim 5, wherein the second portion is provided using the account of the payment provider system.

7. The payment provider system of claim 5, wherein at least one of the plurality of funding instruments is a payment account with the payment provider system for a user associated with the plurality of funding instruments.

8. The payment provider system of claim 7, wherein the operations further comprise:
determining that the user is an existing user with the payment provider system and the payment account is active with the payment provider system.

9. The payment provider system of claim 5, wherein the presenting of the second option is based on at least one of credit worthiness of a user associated with the plurality of funding instruments, a payment history of the user, or cash reserves of the user.

10. The payment provider system of claim 9, wherein presentation of the second option is further based on a total amount of the transaction.

11. A non-transitory machine-readable medium having stored thereon machine-readable instructions executable to cause a machine to perform operations comprising:
receiving, from a device, a request to establish an account based on a plurality of funding instruments;
establishing the account based on the plurality of funding instruments;
generating a card identifier for the account; and
loading a service application to the device;
receiving the card identifier associated with a transaction card during a checkout process for a transaction;
determining the plurality of funding instruments associated with the card identifier;
presenting a first request to select one of a first option or a second option through the service application associated with the card identifier, wherein the first option delays assignment of a payment for the transaction to one or more of the plurality of funding instruments, wherein the second option assigns a first one of a plurality of funding instruments to process a first portion of the payment during the checkout process, wherein the second option requires a selection of the first one of the plurality of funding instruments and a selection of an amount for the first portion of the transaction, wherein the second option delays assignment of a second one of the plurality of funding instruments during the checkout process for a second portion of the payment based on at least one of credit worthiness of a user associated with the plurality of funding instruments, a payment history of the user, cash reserves of the user, a total amount of the transaction, and wherein the presenting is performed through a first display of a graphical user interface (GUI) of the service application during the checkout process in response to an entry of the card identifier for the transaction;
in response to receiving a selection of one of the first option or the second option, processing of a payment for the transaction, wherein receiving a selection of the second option causes processing of the payment for the transaction using the first one of the plurality of funding instruments for the first portion of the transaction instead of the account of a payment provider;
subsequent to the processing of the payment for the transaction, automatically assigning a second one of the plurality of funding instruments for a reimbursement transaction to the payment provider for the payment, wherein the reimbursement transaction is processed at a later time;
presenting, after the checkout process and prior to the later time, a second request to change the second one of the plurality of funding instruments to assign to the processed transaction at the later time, wherein the presenting is performed through a second display of the GUI of the service application; and
processing the reimbursement transaction at the later time based on the second request.

12. The non-transitory machine-readable medium of claim 11, wherein the second portion is provided using the account of the payment provider.

13. The non-transitory machine-readable medium of claim 11, wherein at least one of the plurality of funding instruments is a payment account with the payment provider for a user associated with the plurality of funding instruments.

14. The non-transitory machine-readable medium of claim 13, wherein the operations further comprise:
determining that the user is an existing user with the payment provider and the payment account is active with the payment provider.

15. The non-transitory machine-readable medium of claim 11, wherein the presenting of the second option is based on at least one of credit worthiness of a user associated with the plurality of funding instruments, a payment history of the user, or cash reserves of the user, and wherein the presenting of the second option is further based on an amount of the transaction.

* * * * *

UNITED STATES PATENT AND TRADEMARK OFFICE
CERTIFICATE OF CORRECTION

PATENT NO. : 10,296,899 B2
APPLICATION NO. : 14/940096
DATED : May 21, 2019
INVENTOR(S) : George Lee et al.

Page 1 of 1

It is certified that error appears in the above-identified patent and that said Letters Patent is hereby corrected as shown below:

In the Specification

In Column 4, Line 34, change "back to the merchant After the transaction is authorized" to --back to the merchant. After the transaction is authorized--

In Column 8, Line 13, change "Alternatively, if within the" to --Alternatively, if, within the--

Signed and Sealed this
Eighth Day of October, 2019

Andrei Iancu
*Director of the United States Patent and Trademark Office*